United States Patent [19]
Holch

[11] Patent Number: 5,090,393
[45] Date of Patent: Feb. 25, 1992

[54] PRESSURE REGULATING VALVE FOR INSTALLATION IN A VENT DUCT OF AN INTERNAL COMBUSTION ENGINE

[75] Inventor: Hans-Werner Holch, Heilbronn, Fed. Rep. of Germany

[73] Assignee: Filterwerk Mann & Hummel GmbH, Ludwigsburg, Fed. Rep. of Germany

[21] Appl. No.: 728,674

[22] Filed: Jul. 11, 1991

[30] Foreign Application Priority Data

Jul. 11, 1990 [DE] Fed. Rep. of Germany ....... 4022129

[51] Int. Cl.⁵ .................. F16K 7/17; F01M 13/00; F01M 13/02
[52] U.S. Cl. .................. 123/574; 137/907; 137/599.2
[58] Field of Search ............ 123/574, 573, 572; 137/907, 599.2, 601

[56] References Cited

U.S. PATENT DOCUMENTS

| | | | |
|---|---|---|---|
| 4,327,773 | 5/1982 | Detweiler | 137/907 |
| 4,373,499 | 2/1983 | Bendig | 123/574 |
| 4,580,543 | 4/1986 | Aoki | 123/574 |
| 4,686,952 | 8/1987 | Zeigler et al. | 123/574 |
| 4,919,168 | 4/1990 | Wagner | 137/907 |

FOREIGN PATENT DOCUMENTS 7822216 4/1979 Fed. Rep. of Germany.

*Primary Examiner*—E. Rollins Cross
*Assistant Examiner*—M. Macy
*Attorney, Agent, or Firm*—Foley & Lardner

[57] ABSTRACT

A pressure regulating valve, especially for regulating the vacuum in the crankcase of an internal combustion engine, which includes a pan-shaped housing having a bottom part, a housing cover, and a diaphragm 14 arranged between the housing and housing cover. A hollow cylindrical part 26 is arranged adjacent the diaphragm and encloses an intermediate valve member which is held in its rest position by a compression spring 24. The diaphragm is moved by a further compression spring 25 into an upper, rest position. If a vacuum in the intake manifold exceeds a certain limit value, the first valve opening between the valve seat 17 and the valve plate 18 closes against the force of the spring 24, so that blow-by gases aspirated from the crankcase are carried through the valve opening 20. If the intake manifold vacuum increases further, the diaphragm 14 moves toward the valve opening 20 and, at a maximum permissible vacuum, closes this valve opening as well. This two-stage valve is constructed in an especially compact and space-saving manner, and can be set to specific pressure limits by appropriately sizing the compression springs or the cross-sectional ratios of the valve parts.

10 Claims, 3 Drawing Sheets

PRESSURE REGULATING VALVE FOR INSTALLATION IN A VENT DUCT OF AN INTERNAL COMBUSTION ENGINE

BACKGROUND OF THE INVENTION

This invention relates to a pressure regulating valve for installation in a vent duct in an internal combustion engine.

Pressure regulating valves of this kind are used, for example, in the vent duct between the crankcase and the intake manifold or air filter. Another typical application is installation in the vent duct of the fuel tank. In either case the object is to prevent the pressure or the partial vacuum in the space being vented from increasing beyond a certain level.

German Utility Model No. DE-G 78 22 216 discloses a pressure regulating valve which contains only a single valve device comprising a diaphragm which controls passage through the mouth of a vent passage and closes the passage if necessary. To enable a sufficient amount of gas to be vented through the pressure regulating valve when a relatively slight vacuum prevails at full load operation corresponding to a wide-open main throttle valve in the engine's intake manifold, the mouth of the vent passage must be rather large. If a greater vacuum occurs in the intake manifold, for example due to the closing of the main throttle valve, this vacuum exerts a considerable force on the diaphragm through the orifice of the vent duct when the pressure regulating valve is closed. It would be possible to counteract this force only with a correspondingly strong valve spring. But the result would be that the diaphragm would have to have an undesirably large diameter in order to be able to perform its regulating function as well at lower vacuums. Consequently, this known pressure regulating valve only functions well if the fluctuations of the vacuum needed for venting remained within relatively narrow limits.

Another pressure regulating valve is disclosed in Bendig, U.S. Pat. No. 4,373,499, which attempts to avoid this disadvantage. This valve operates with two diaphragms connected in parallel. Each diaphragm is spring loaded, and each spring and diaphragm is designed so that the valve that has the larger valve opening closes first when a certain vacuum level is reached, and the second valve, which has a smaller valve opening, also closes if a still higher vacuum occurs. Thus this valve can be used even if the vacuum used for venting fluctuates considerably.

SUMMARY OF THE INVENTION

It is the object of the invention to provide an improved pressure regulating valve.

It is also an object of the invention to provide a pressure regulating valve can function satisfactorily even if the vacuum which acts as the controlling pressure fluctuates to a considerable extent.

Yet another object of the invention is to provide a pressure regulating valve which, even in the case of great fluctuations of the vacuum that acts as the controlling pressure, will be able to provide a relatively constant pressure in a space that is to be vented.

A further object of the invention is to provide a pressure regulating valve which has a compact, simple design.

These and other objects of the invention are achieved by providing a pressure regulating valve comprising a valve housing comprising a housing bottom and a housing cover, an inlet nipple leading into the housing bottom, an outlet nipple leading from the housing bottom having an inner end configured as a first valve seat disposed within the valve housing, a diaphragm for dividing the valve housing into a valve chamber and a vent chamber, the diaphragm comprising a diaphragm valve plate facing the first valve seat, a vent opening connecting the vent chamber to the ambient atmosphere, a first compression spring in the valve chamber for urging the diaphragm away from the first valve seat, and an intermediate valve member disposed between the diaphragm valve plate and the first valve seat such that the intermediate valve member can move axially relative to the first valve seat and the diaphragm can move axially relative to the intermediate valve member, the intermediate valve member comprising a second valve plate facing and cooperating with the first valve seat to form a primary valve and a second valve seat facing the diaphragm and cooperating with the diaphragm valve plate to form a secondary valve.

An important advantage of the invention is the combining of two valves for different pressures, both valves being disposed on the single diaphragm, while at the same time a simple and easy-to-assemble construction of the entire pressure regulating valves is obtained.

The specially designed parts of the valve are manufactured by injection molding from plastic, for example. It is thus possible to manufacture such valves at reasonable cost and in mass production.

The configuration in accordance with the invention also makes it possible to adjust valve operation with great accuracy, i.e., the size of the two compression springs in the valve as well as that of the valve openings may be tailored to each special application.

According to a further development of the invention the intermediate valve is situated in a hollow cylindrical part. This hollow cylindrical part simultaneously forms the abutment for the axial movement of the intermediate valve. Furthermore, it provides radial guidance for the intermediate valve disposed concentrically with the diaphragm.

In a further embodiment of the invention provision is made for disposing a pan-shaped supporting body on the diaphragm. This supporting body forms the bearing surfaces both for the compression springs and for the hollow cylindrical part, which holds the intermediate valve in place.

The interposition of a supporting body assures that the diaphragm, which is made, for example, of a rubber-like material, will be protected against damage, e.g. from the spring.

BRIEF DESCRIPTION OF THE DRAWINGS

The invention will be described further with reference to an illustrative preferred embodiment shown in the accompanying drawings in which.

DETAILED DESCRIPTION OF PREFERRED EMBODIMENTS

In practical operation of an internal combustion engine, blow-by gas is aspirated in the direction of the arrows through a pressure regulating valve built into a vent duct between the intake manifold and the crankcase of the engine. It is required that a slight vacuum must always prevail in the crankcase during operation so that no blow-by gases can escape to the exterior through the vent duct and contaminate the environment.

On the other hand, it is also required that the pressure not decrease below a predetermined vacuum level, because otherwise dust might be sucked into the crankcase due to leakage.

Figure 1:
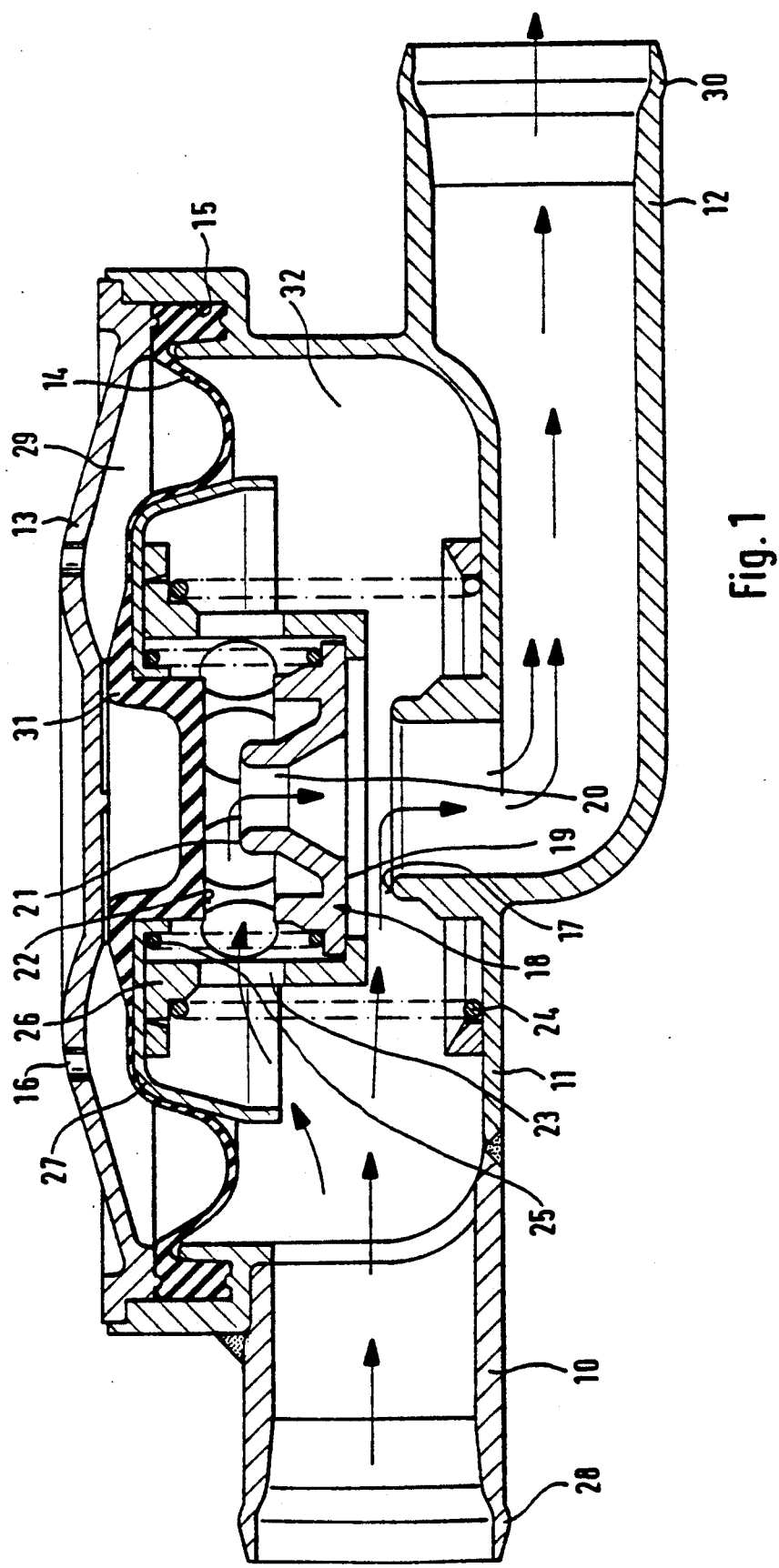
FIG. 1 is a sectional view through a pressure regulating valve with the valves open.

FIG. 1 shows a pressure regulating valve which is intended for installation in the vent line between the intake manifold and the crankcase of an internal combustion engine and consists of a valve housing 11 having an inlet nipple 10. This inlet nipple is provided at its outer end with a bead 28 so that a hose or the like can be attached to it.

Valve housing 11 is open at the top and is formed with an annular groove 15 adjacent its upper opening. A cover 13 is fastened over this opening of the valve housing 11, with a diaphragm 14 inserted between the cover and the valve housing. The center part of this diaphragm is thickened and has a flat valve plate surface 22 facing the valve housing in this area.

Between the diaphragm 14 and the housing cover 13 a first valve chamber 29 is formed, which communicates through a vent hole 16 with the ambient atmospheric pressure. The valve housing 11 furthermore has an outlet nipple 12. The outlet nipple leads into the valve housing coaxially therewith and terminates in a valve seat 17 within the valve housing 11. This outlet nipple 12 also is provided with a bead 30 for attaching a hose.

The center portion of diaphragm 14 is supported by a supporting body 27 which protects the diaphragm from the parts which act on the diaphragm. A hollow cylindrical part 26 is provided in contact with supporting body 27. Part 26 can either be fixedly joined to supporting body 27 or it can be constructed as a separate element.

A compression spring 24 engages an annular collar on the hollow cylindrical part 26. The opposite end of this compression spring 24 is supported on the valve housing. Compression spring 24 urges diaphragm 14 toward its upper end position in which the thickened portion 31 of the diaphragm contacts the housing cover 13.

An intermediate valve 18 is disposed inside hollow cylindrical part 26. This intermediate valve 18 is provided with a valve plate 19 and with a valve seat 21 which surrounds a valve opening 20 having a certain diameter which is smaller than the diameter of the opening surrounded by valve seat 17.

When the system is at rest, compression spring 24 holds intermediate valve 18 in the position shown in FIG. 1. This intermediate valve 18 forms two differently acting valves in the pressure regulating valve, namely one valve consisting of valve plate 19 and valve seat 17, and another valve consisting of valve plate 22 and valve seat 21.

Figure 2:
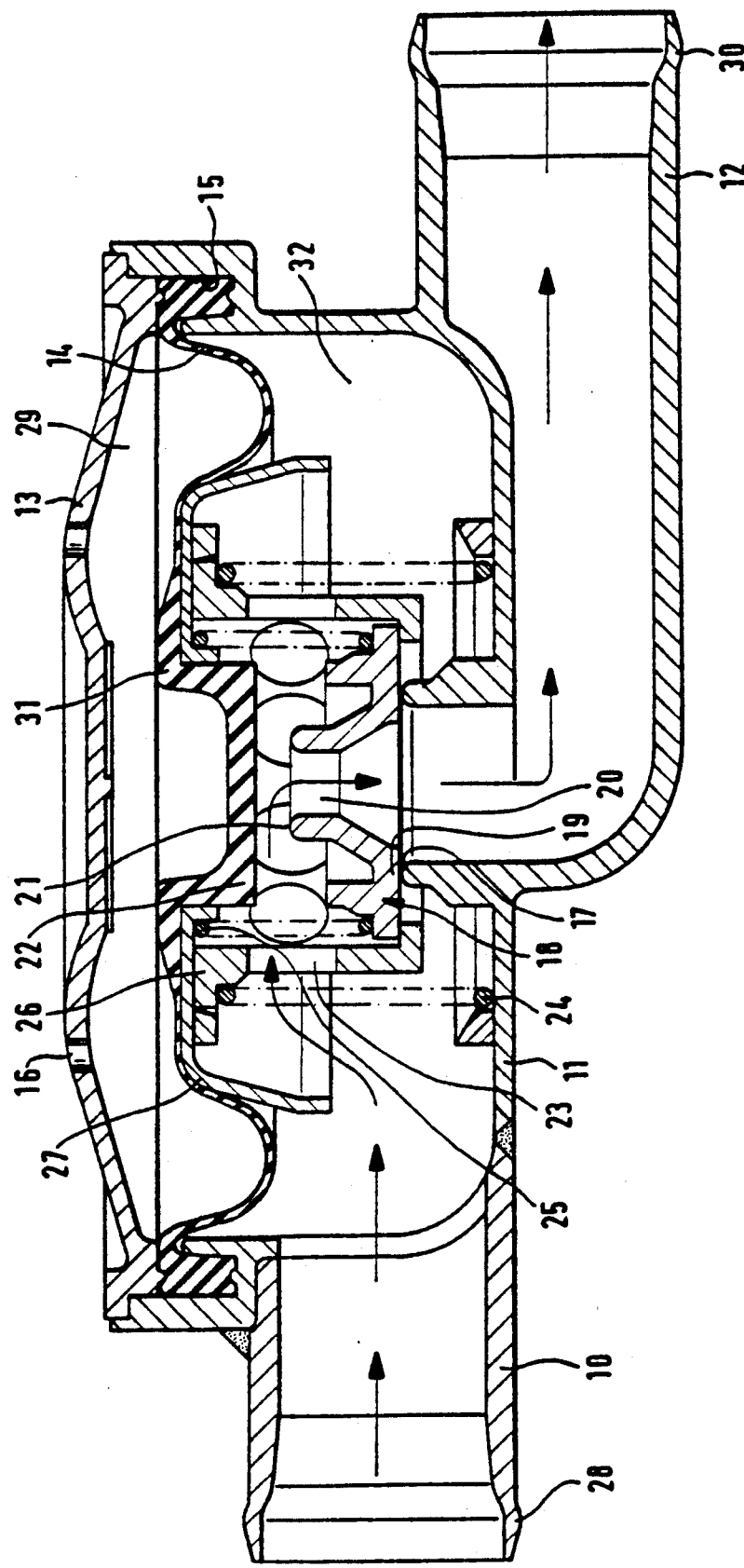
FIG. 2 is a sectional view showing the pressure regulating valve of FIG. 1 with the first valve closed.

Hollow cylindrical part 26 is provided with openings 23, the purpose of which will be explained further with reference to FIG. 2.

With the valve in the position shown in FIG. 1, gases which form in the crankcase, and enter through the inlet nipple 10, are aspirated through the outlet nipple 12, while both valves are open. This valve position is in effect whenever the intake manifold vacuum is very low or when virtually no intake manifold vacuum prevails. In this position the greatest possible throughput of blow-by gases can be achieved even at a low intake manifold vacuum.

FIG. 2 again shows the pressure regulating valve depicted in FIG. 1. The pressure regulating valve is now in an intermediate position. This position is assumed whenever a certain limit value of the intake manifold vacuum has been attained which is above the maximum permissible vacuum in the crankcase.

As the pressure falls toward a predetermined level, which is lower than the atmospheric pressure, the diaphragm 14 shown in the rest position in FIG. 1, and with it the valve plate 19, moves increasingly toward the valve seat 17 as the pressure falls, until the passage through the first stage valve formed by valves seat 17 and valve plate 19 finally is shut off against the force of the compression spring 24 when the pressure in vent chamber 32 falls below the limit.

In this state the vacuum applied to the vent nipple 12, which can amount, for example, to as much as 800 mbar when the main throttle valve of the internal combustion engine is closed, acts through valve opening 20 on the diaphragm 14. The blow-by gases then flow via the openings 23 through this valve opening 20 as indicated by the arrows in FIG. 2.

Figure 3:
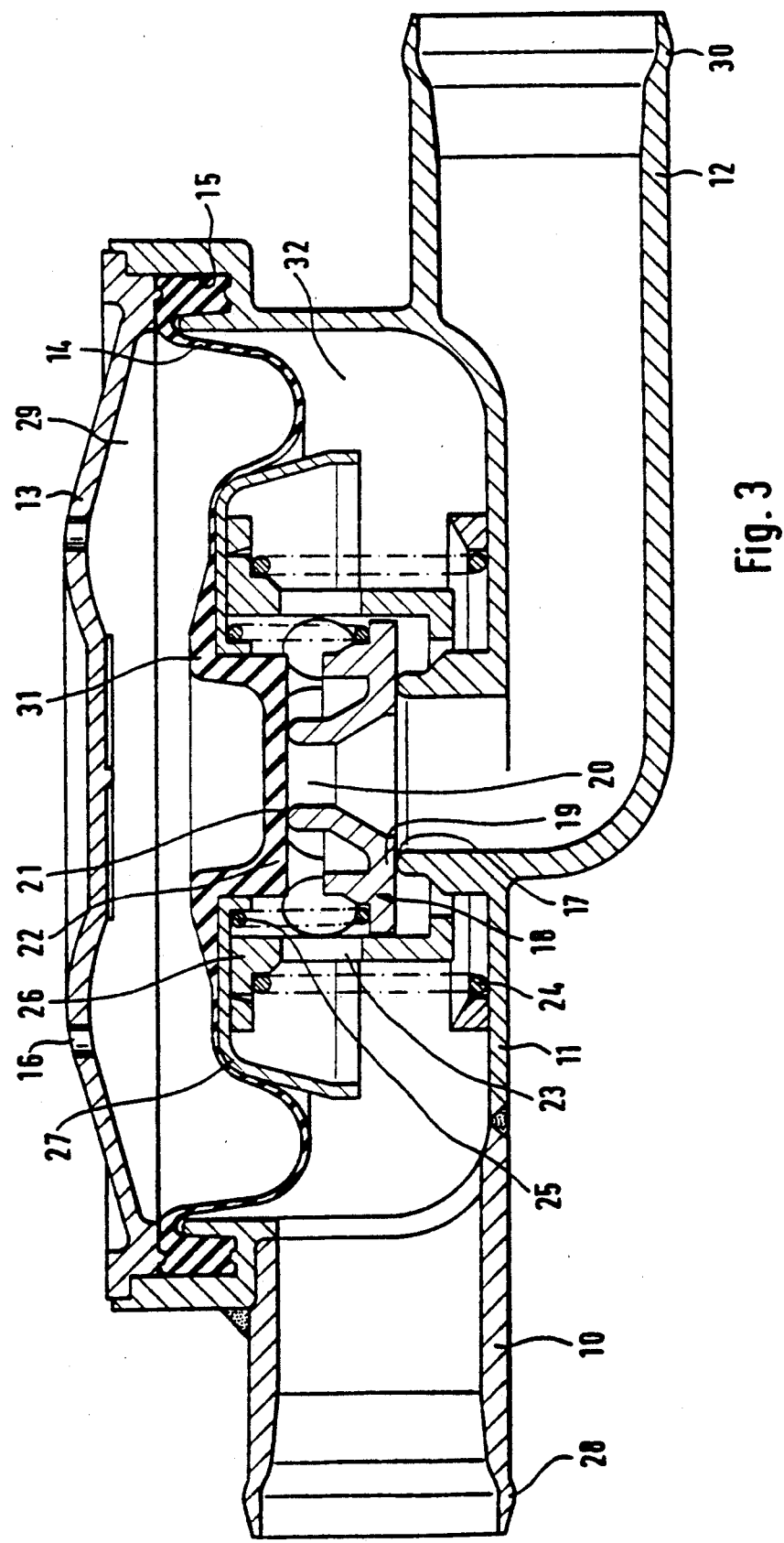
FIG. 3 is a corresponding sectional view showing the pressure regulating valve of FIGS. 1 and 2 in the fully closed state.

If an even higher vacuum develops in the intake manifold, then diaphragm 14 will move further downward against the force of spring 25 until, at a maximum intake manifold vacuum, the valve plate 22 portion of the diaphragm 14 contacts the valve seat 21 and thus closes this opening also as shown in FIG. 3. In this position no blow-by gases flow from the crankcase into the intake manifold. But as soon as the pressure in the crankcase increases in this illustrated position, or the intake manifold vacuum decreases, the diaphragm will again lift off from the valve seat 21 of the intermediate valve 18 and thus also first the smaller opening will be opened and, as the intake manifold vacuum continues to decrease (for example the vacuum in the intake manifold of the internal combustion engine decreases due to the opening of the main throttle valve), eventually the larger opening, i.e., the valve between the valve seat 17 and the valve plate 19, will also be opened.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A pressure regulating valve comprising a valve housing comprising a housing bottom and a housing cover, an inlet nipple leading into said housing bottom, an outlet nipple leading from said housing bottom having an inner end configured as a first valve seat disposed within said valve housing, a diaphragm for dividing the valve housing into a valve chamber and a vent chamber, said diaphragm including a diaphragm valve plate facing said first valve seat, a vent opening connecting said vent chamber to the ambient atmosphere, a first compression spring in said valve chamber for urging said diaphragm away from said first valve seat, and an intermediate valve member disposed between said diaphragm valve plate and said first valve seat such that said intermediate valve member can move axially relative to said first valve seat and said diaphragm can move axially relative to said intermediate valve member, said intermediate valve member comprising a second valve plate facing and cooperating with said first valve seat to form a primary valve and a second valve seat facing said diaphragm and cooperating with said diaphragm valve plate to form a secondary valve.

2. A pressure regulating valve according to claim 1, wherein said intermediate valve member is disposed in a hollow cylindrical member which is arranged adjacent said diaphragm and is provided with openings on its periphery.

3. A pressure regulating valve according to claim 1, further comprising a second compression spring disposed between said diaphragm and said intermediate valve member for urging said diaphragm valve plate away from said second valve seat.

4. A pressure regulating valve according to claim 3, wherein a pan-shaped supporting body is arranged adjacent said diaphragm, said supporting body having an opening in the area of said diaphragm valve plate, and said first and second compression springs rest against said supporting body.

5. A pressure regulating valve according to claim 1, wherein the valve formed by said second valve plate and said first valve seat closes when a vacuum exceeding a first limit value occurs in said valve chamber, and the valve formed by said diaphragm valve plate and said second valve seat closes when a vacuum exceeding a second, higher limit value occurs in said valve chamber, thereby limiting the vacuum in a space vented to said valve chamber.

6. A pressure regulating valve according to claim 5, wherein said vented space is a crankcase of an internal combustion engine.

7. A pressure regulating valve according to claim 1, wherein said valve is disposed in a vent duct communicating between a crankcase of an internal combustion engine and an air filter or intake manifold of said engine.

8. A pressure regulating valve according to claim 1, wherein said diaphragm has a margin portion clamped sealingly in a groove formed between said housing cover and said housing bottom.

9. A pressure regulating valve according to claim 1, wherein said first compression spring rests against a floor of said housing bottom and urges said diaphragm toward said housing cover.

10. A pressure regulating valve according to claim 1, wherein said housing bottom is pan-shaped, and said first valve seat is disposed centrally in said housing bottom.

* * * * *